US007383499B2

(12) United States Patent
Kraft et al.

(10) Patent No.: US 7,383,499 B2
(45) Date of Patent: Jun. 3, 2008

(54) SYSTEM AND METHOD FOR DYNAMICALLY CREATING A DESTINATION TEMPLATE

(75) Inventors: Tara M. Kraft, Seattle, WA (US); Robert M. Dolin, Seattle, WA (US); John T. Carlson, Seattle, WA (US); Cory J. Cirrincione, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 11/027,186

(22) Filed: Dec. 30, 2004

(65) Prior Publication Data

US 2006/0150088 A1 Jul. 6, 2006

(51) Int. Cl.
*G06F 17/24* (2006.01)
(52) U.S. Cl. ............... 715/246; 715/243; 715/277; 715/253
(58) Field of Classification Search ........... 715/500, 715/517, 520, 523, 513, 514, 515, 522, 243, 715/246, 277, 253, 249
See application file for complete search history.

(56) References Cited

U.S. PATENT DOCUMENTS

| 5,860,073 | A | * | 1/1999 | Ferrel et al. ............ 715/522 |
| 5,895,476 | A | * | 4/1999 | Orr et al. ................ 715/517 |
| 6,499,041 | B1 | * | 12/2002 | Breslau et al. .......... 715/505 |
| 2003/0014442 | A1 | * | 1/2003 | Shiigi et al. ............ 707/513 |
| 2004/0205467 | A1 | * | 10/2004 | Kofman et al. ......... 715/500 |

* cited by examiner

*Primary Examiner*—Stephen Hong
*Assistant Examiner*—Adam L Basehoar
(74) *Attorney, Agent, or Firm*—Lee & Hayes, PLLC

(57) ABSTRACT

The techniques and mechanisms described herein are directed to a method for dynamically creating a destination template based on content within a source document. The destination template may be published in a variety of mediums including as a body of an email message, a web site, and a print-friendly document. A portion of content objects within the source document are grouped into content objects based on a relationship between the content objects, such as a physical relationship, a functional relationship, or a combination of both. For each content block, one of several module templates is dynamically selected and arranged to create the destination template. The module templates may be stretchable and designed to render in an email client using HTML.

20 Claims, 6 Drawing Sheets

SYSTEM AND METHOD FOR DYNAMICALLY CREATING A DESTINATION TEMPLATE

TECHNICAL FIELD

This document generally relates to the publishing of content, and more particularly, to a process for dynamically creating a template for use when publishing the content.

BACKGROUND

Modern desktop publishing applications allow users to create a variety of useful documents, such as newspapers, newsletters, brochures, advertisement layouts, stationery, and the like. The desktop publishing applications may provide p re-defined templates to aid users in the preparation of their documents. For example, there may be a pre-defined template for preparing a newsletter and another for creating a brochure. Each pre-defined template may have placeholders for headlines, pictures, stories, and the like. The user may then add content within these placeholders to create their own document.

Using the desktop publishing applications, the users may create quite elaborate and complex layouts. For example, the user can precisely position objects on a page, create a 2-D layout, and the like. In addition, the user may create multiple pages, where a story begins on one page and continues on another page. Typically, when the user is ready to publish their created document, the user selects the printing option on the desktop publishing application and obtains a hard copy of their document. The user can then distribute hard copies of the document to their intended audience.

With the advent of the computer age, it has become more common for a user to distribute their document electronically, such as via email, rather than distributing hard copies of the document. Currently, if the user wants their document to be distributed electronically, the user attaches the document to an email and sends the email to their intended audience. However, there are several disadvantages when publishing documents via an attachment. One disadvantage is that the recipients may easily overlook the attachment. Another disadvantage is that the recipients may choose not to open the attached document due to security concerns, insufficient time, the inconvenience of opening an attachment, or the like. In addition, even if the receipient chooses to open the attached document, the document can only be opened if a program is available that supports reading the file type of the attached document. Thus, the electronic publishing of a document may not be as effective as desired.

Therefore, until now, there has not been a satisfactory solution for publishing complex documents via email.

SUMMARY

The techniques and mechanisms described herein are directed to a method for dynamically creating a destination template or a layout based on content within a source document. The destination template maybe published in a variety of mediums including as a body of an email message, a web site, and a print-friendly document. A portion of content objects within the source document are grouped into content objects based on a relationship between the content objects, such as a physical relationship, a functional relationship, or a combination of both. For each content block, one of several module templates is dynamically selected and arranged to create the destination template. The module templates may be stretchable and designed to render in an email client using HTML.

BRIEF DESCRIPTION OF THE DRAWINGS

Non-limiting and non-exhaustive embodiments are described with reference to the following figures, wherein like reference numerals refer to like parts through-out the various views unless otherwise specified.

DETAILED DESCRIPTION

Briefly, the present system and method is directed at dynamically creating a destination template or a layout based on content within a source document. Desktop publishing applications incorporating the present creation mechanism allow users to create content once and publish the content in multiple mediums, such as print, website, email, and the like, without editing or modifying the content when switching mediums. The creation mechanism creates an optimal template based on the content and the desired medium. These and other advantages will become clear after reading the following detailed description.

Exemplary Computing Environment

Figure 1:
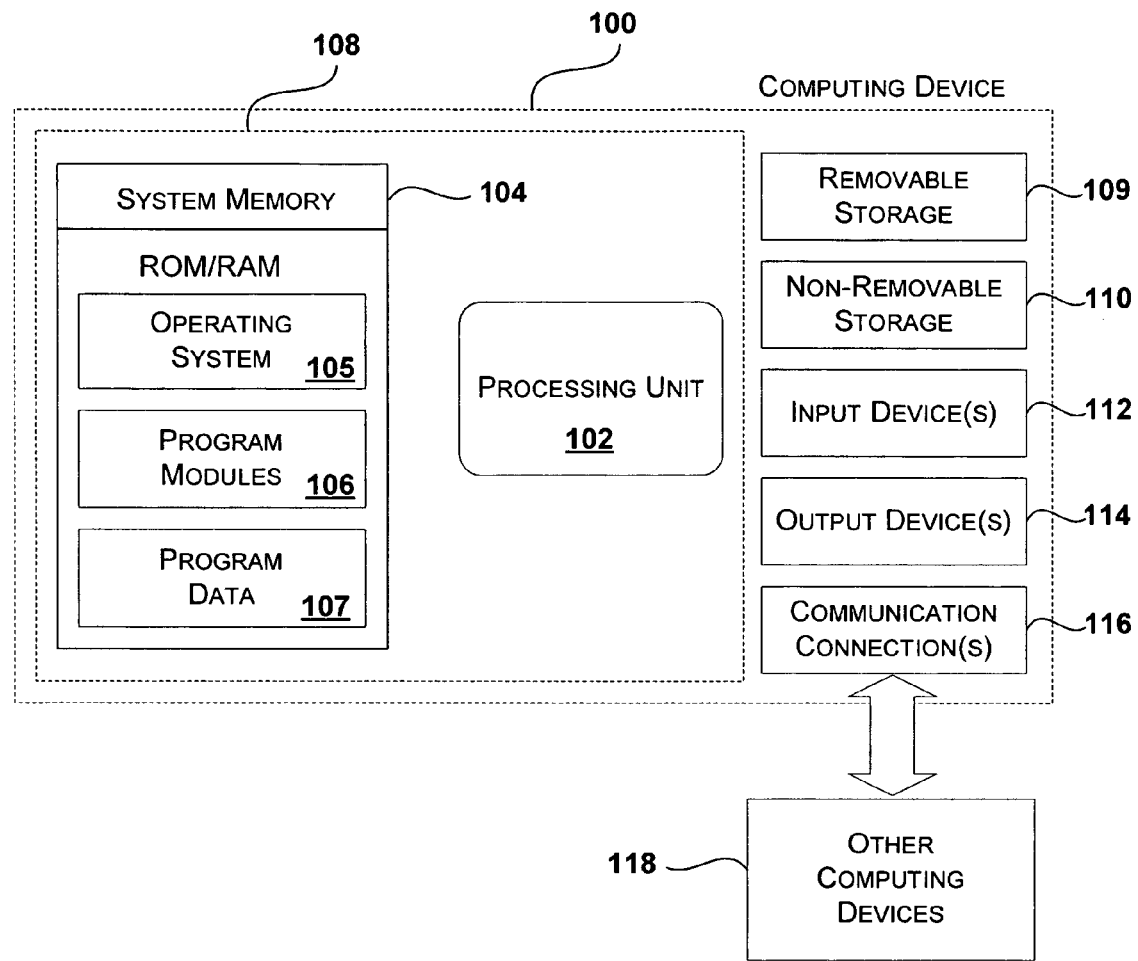
FIG. 1 is an illustrative computer environment that may be used to implement the techniques and mechanisms described herein.

The various embodiments of the dynamic template creation technique may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 1, one exemplary system for implementing the present dynamic template creation mechanism includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Exemplary Dynamic Template Creation Process

Figure 2:
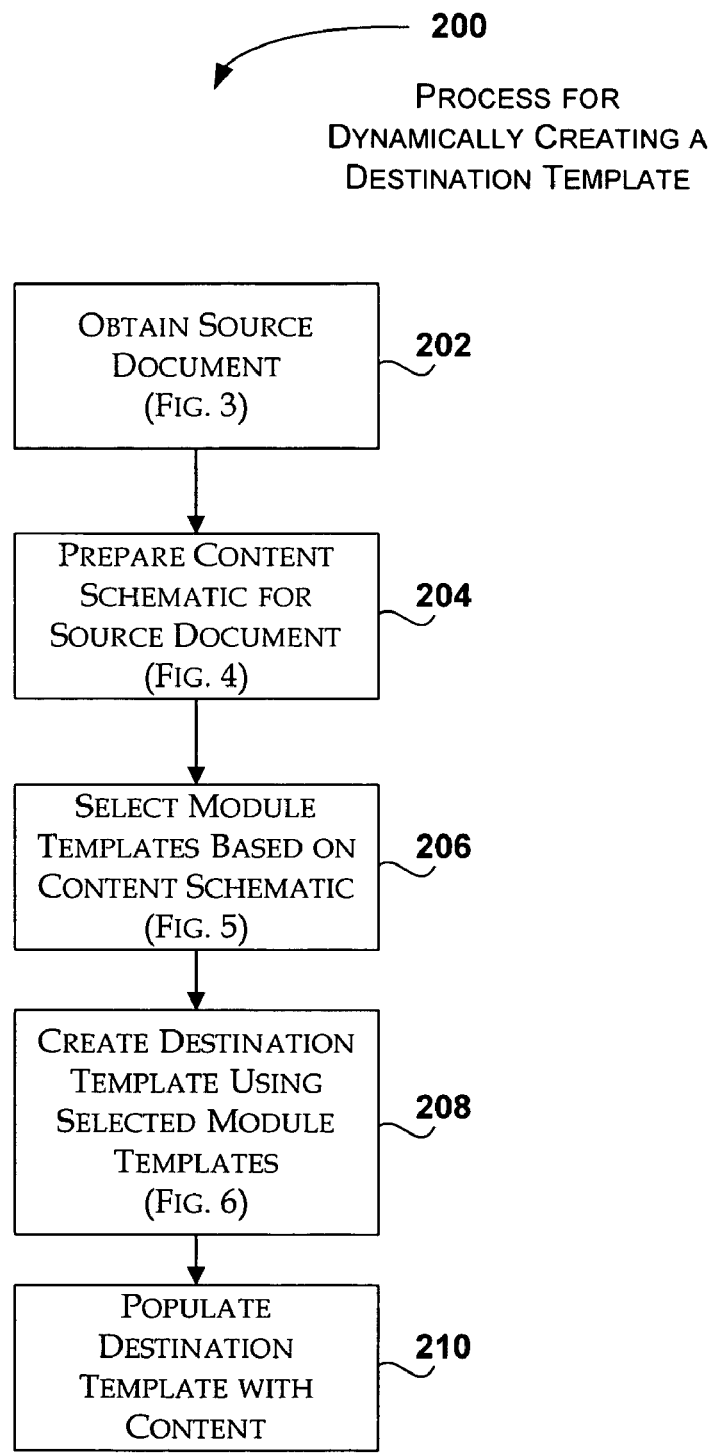
FIG. 2 is a flow diagram illustrating an exemplary process for dynamically creating a destination template.

FIG. 2 is a flow diagram illustrating an exemplary process for dynamically creating a destination template. The discussion below describes the dynamic template creation process with respect to a desktop publishing application, which may be one of the program modules 106 shown in FIG. 1. However, the present dynamic template creation process is also applicable within other applications, such as word processing applications, web design applications, and the like.

The present dynamic template creation process may be invoked via several different entry points. For example, a user of the desktop publishing application may select an option to convert one document type (e.g., newsletter) to another document type (e.g., email). In another variation, the user may select a "send email" button while a newsletter is in the current view. An optional user interface may be provided to the user in order to confirm the user's desire to proceed with the conversion of the source document into another format using the present dynamic template creation mechanism. Once the process is invoked, the process proceeds to block 202.

At block 202, a source document is obtained. Typically, each type of application has a document type specific to that type of application. The document may be opened using one of the menus within the application. The document may be stored in a format particular to the application. For example, in a desktop publishing application, the document may be stored in a compressed format that supports the storing of shapes. In addition, the document may be started from blank or be based on one of several templates, such as a newsletter template and the like. The document in the current view for the application is considered the source document in the following example.

At block 204, a content schematic for the source document is prepared. In overview, described below in detail in conjunction with FIG. 4, the preparation of the content schematic groups the individual content pieces in the source document into content blocks, where applicable. In addition, the preparation of the content schematic also assigns a relative importance to the content blocks and remaining content pieces (i.e., content objects). The relative importance may be based on a variety rules, such as position, size of content block, and the like. The content schematic itself includes a list of object properties, a proximity graph, and a relationship tree associated with the source document. The list of object properties includes information regarding individual content objects or content placeholders contained in the source document. The proximity graph represents the physical relationships between content objects or content placeholders included within the source document. The relationship tree illustrates functional and/or contextual relationships between content objects and/or content placeholders in the source document. Processing continues at block 206.

At block 206, one or more module templates are selected based on the content blocks and content pieces identified during the preparation of the content schematic in block 204. In overview, described in detail below in conjunction with FIG. 5, a module template is dynamically selected that can adequately hold the information for each content block and for each remaining content object. Processing continues at block 208.

At block 208, a destination template is created using the selected module templates. Thus, instead of identifying one template that can best hold the information of the source document, multiple module templates are pieced together in order to create the destination template. These dynamically selected module templates then determine the layout for the destination document. Processing continues at block 210.

At block 210, the destination template is populated with the content. The content within the content schematic for the source document is mapped to corresponding placeholders within the destination template to create the destination document. The destination document may be formatted for use in various mediums, such as hard copies, websites, emails, and the like. The hard copies being in a format that provides a print-friendly document that is easily readable by recipients.

Figure 3:
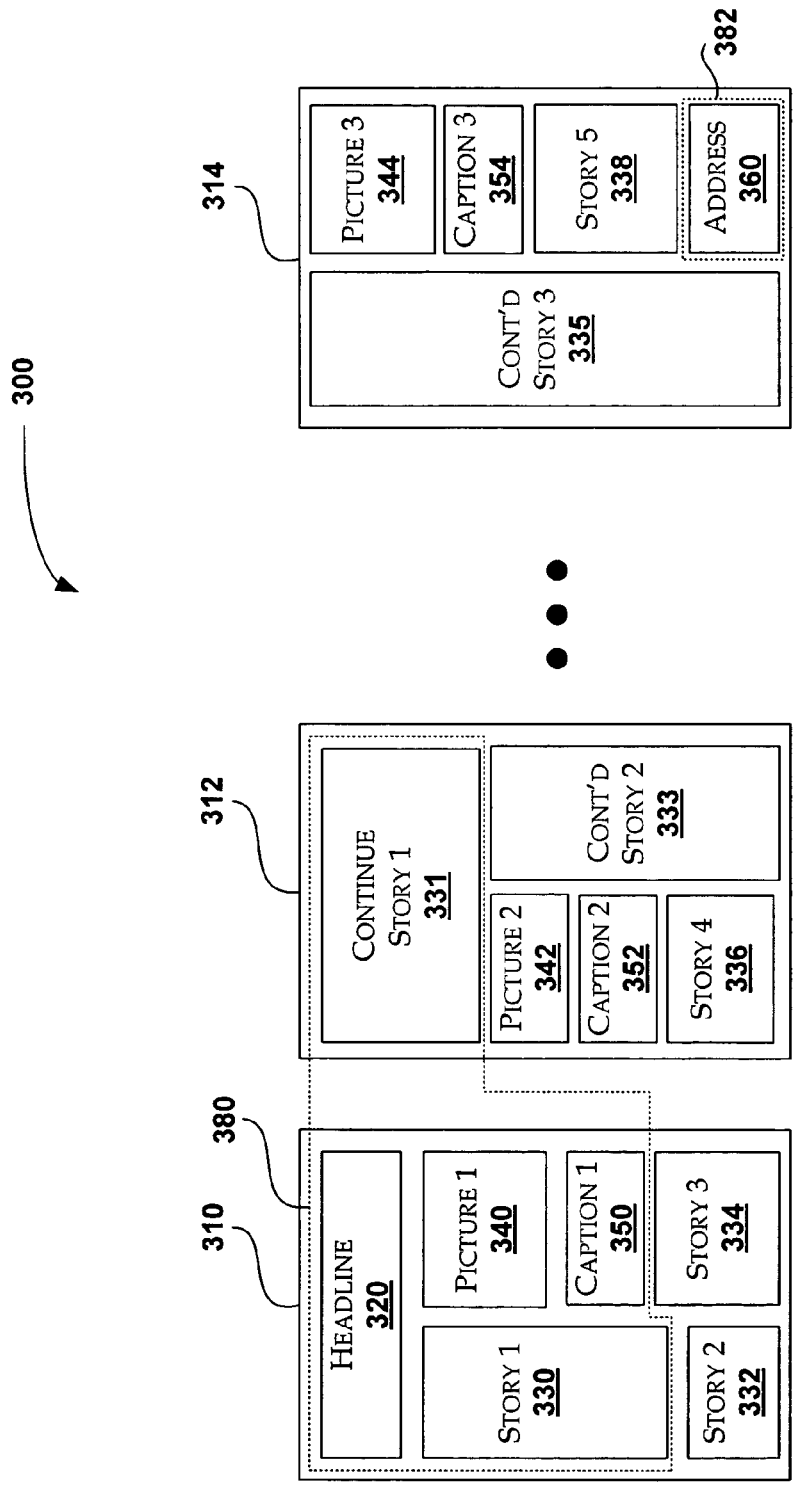
FIG. 3 is a graphical depiction of a source document having multiple pages.

FIG. 3 is a graphical depiction of a source document 300 having multiple pages (e.g., pages 310, 312, 314). While the source document in FIG. 3 is in the form of a newsletter, the present dynamic template creation mechanism operates similarly when the source document is in any one of several other forms, such as newspaper, advertisement, and the like. In addition, the source document does not necessarily need to have multiple pages. As shown, the illustrative source document 300 includes multiple pages (e.g., page 310, 312, and 314). Each page 310-314 holds pieces of content (i.e., content objects) within their respective content placeholders. For example, page 310 includes content placeholders 320, 330, 332, 334, 340, and 350. Each of these content placeholders may be associated with a specific type of content (e.g., text, graphics, audio, video, and the like). Content placeholders may also hold more than one type of content. This type of content placeholder is referred to as a multi-purpose content placeholder. For example, a multi-purpose placeholder may hold either a picture or a pull-quote. For simplicity, the following discussion describes content placeholders associated with one type of content. For example, content placeholders 320, 330, 332, 334, 340 are illustrated has user-inserted text and content placeholder 340 is illustrated for containing a picture or image. Content placeholder 320 contains a headline for the newsletter. Content placeholder 330 contains the text of story 1. Content placeholder 332 contains the text of story 2. Content placeholder 340 contains a picture 1. Content placeholder 350 contains text for a caption associated with picture 1. Content placeholder 334 contains text for story 3.

Likewise, pages 312 and 314 include content placeholders and associated content. Page 312 includes content placeholders 331, 333, 336, 342, and 352. Content placeholder 331 contains the text continuing with story 1 from page 310. Content placeholder 342 contains a picture 2. Content placeholder 352 contains text for a caption associated with picture 2. Content placeholder 336 contains text for a story 4. Content placeholder 333 contains text continuing with story 2 from page 310. Page 314 includes content placeholders 335, 338, 344, 354, and 360. Content placeholder 335 contains the text continuing with story 3 from page 310. Content placeholder 344 contains a picture 3. Content placeholder 354 contains text for a caption associated with picture 3. Content placeholder 338 contains text for a story 5. Content placeholder 360 contains text specifying an address.

As discussed above, in the past, if a user wanted to distribute the above newsletter, the user either printed a hard copy for distribution or attached the newsletter to an email for distribution. In addition, the user may have copied and pasted the entire newsletter into an email for distribution. However, the latter approach did not provide a very useful format because the content of the entire multi-page newsletter was in a single one-dimensional continuous file. Therefore, recipients were unable to easily navigate the stories that spanned multiple pages in the newsletter. However, by using the present dynamic template creation process, the content of the multi-page document may dynamically become formatted within the email body in a more visually appealing manner.

Figure 4:
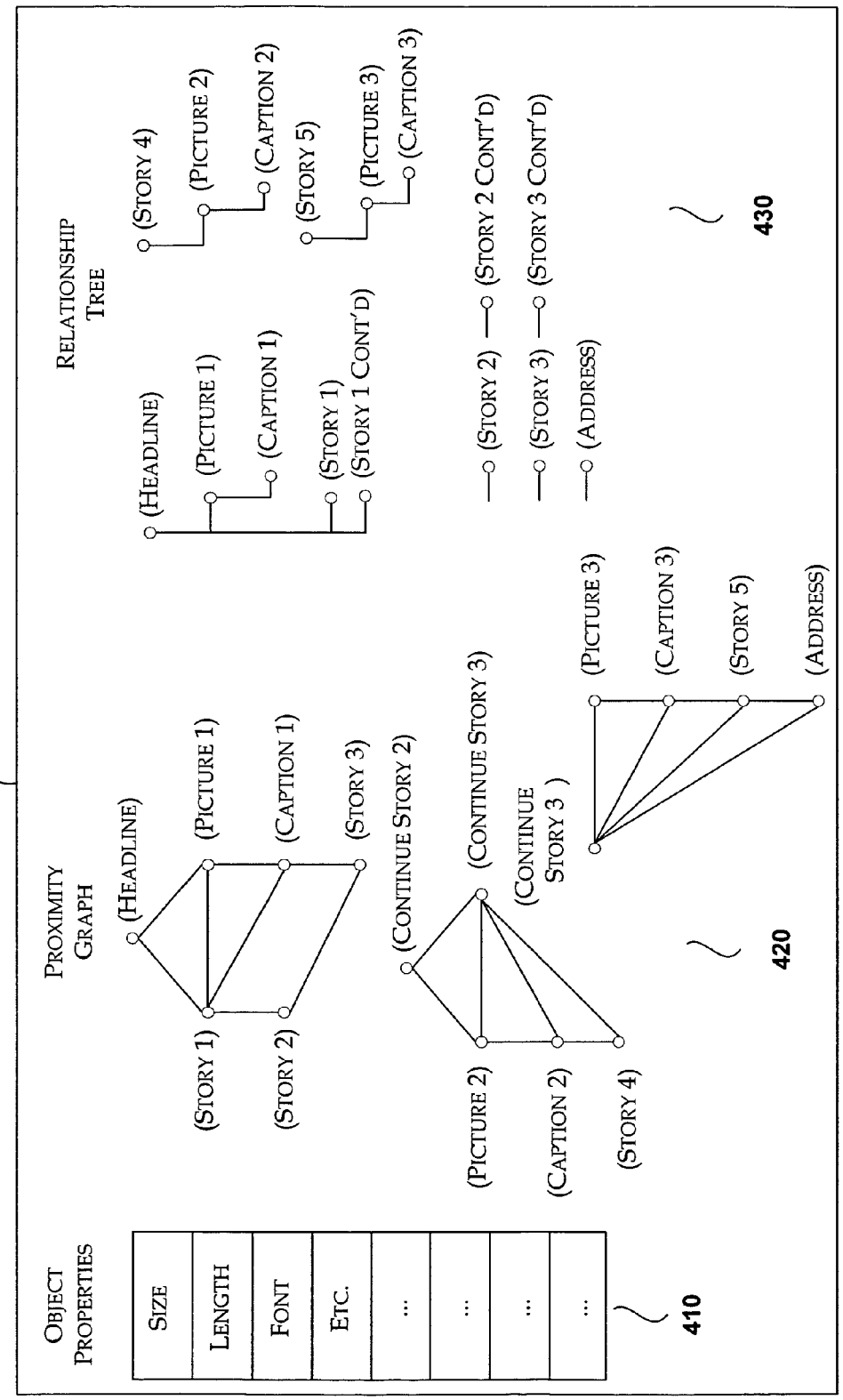
FIG. 4 is a block diagram illustrating a content schematic associated with the source document illustrated in FIG. 3.

FIG. 4 is a block diagram illustrating a content schematic 400 associated with the source document illustrated in FIG. 3. In overview, the content schematic 400 provides information to determine the nature of the content contained within the source document, the relationships between individual content objects contained therein, and any contextual relationships between individual content objects contained therein (e.g., a caption displayed underneath an associated picture). Before explaining the content schematic in further detail, it may be helpful to note that the content schematic aids in determining the grouping of content objects into content blocks (e.g., content block 380 shown in FIG. 3). A content block represents individual content pieces (i.e., content objects/placeholders) that are related. Content pieces are those content objects/placeholders that do not seem to relate to anther content object/placeholder. Thus, the source document may have one or more content blocks and/or one or more content pieces. As will be described below, by identifying these content blocks and content pieces, the present dynamic template creation process selects appropriate module templates for the destination template.

The content schematic 400 includes a list of object properties 410, a proximity graph 420, and a relationship tree 430. The list of object properties 410 prepared for the content schematic 400 for the source document includes information regarding individual content objects or content placeholders contained within the source document. For example, for a given content object, such as a text selection entered by a user, the list of object properties may include the size of the text selection, the length of the text selection, the font with which the text selection is entered and displayed, a location range within the template for the text selection, and the like. Other object properties include special formatting properties applied to the content object including formatting associated with computing languages such as the Extensible Markup Language (XML). For any content placeholders in the source document which does not contain user-inserted content, the list of object properties may nonetheless contain information such as predefined font properties associated with the content placeholders, size limitations associated with text or images that may be inserted into the placeholders, and the like.

The proximity graph 420 generated for the source document represents the physical relationships between content objects or content placeholders within the source document. For example, referring to the proximity graph 420, and referring to the source document 300, illustrated in FIG. 3, the proximity graph 420 illustrates that each of the content placeholders 320, 330, 332, 334, 340, 350 for page 310 and the associated user-inserted content are physically positioned in two vertical columns with a headline positioned over both columns at the top of the page 310. Content placeholder 340 (i.e., Picture 1) and 350 (i.e., Caption 1) are positioned to the right of content placeholder 330 (i.e., Story 1). Content placeholder 332 (i.e., Story 2) is positioned below content placeholder 330 (i.e., Story 1) and to the left of content placeholder 334 (i.e., Story 3). Content placeholder 340, 350, and 334 are positioned in the right column with each successive content placeholder positioned below the immediately preceding content placeholder.

Similarly, for page 312, the proximity graph 420 illustrates content placeholder 312 (i.e., Story 1 Cont'd) across the top of page 312 and the remaining content placeholders 342, 352, 336, and 333 in two vertical columns. Content placeholder 333 (i.e., Story 2 Cont'd) is positioned below content placeholder 331 (i.e., Story 1 Cont'd) in the right hand vertical column. Content placeholders 342 (i.e., Picture 1), 352 (i.e., Caption 2), and 336 (i.e., Story 4) are positioned in the left column with each successive content placeholder positioned below the immediately preceding content placeholder.

Likewise, for page 314, the proximity graph 420 illustrates two vertical columns. Content placeholder 335 (i.e., Story 3 Cont'd) is positioned in the left hand vertical column. Content placeholders 344 (i.e., Picture 3), 354 (i.e., Caption 3), 338 (i.e., Story 5), and 360 (i.e., Address) are positioned in the right column with each successive content placeholder positioned below the immediately preceding content placeholder.

The relationship tree 430 for the content schematic 400 illustrates functional and/or contextual relationships between content objects and/or content placeholders in the source document 300. As illustrated in FIG. 4, content placeholder 320 (i.e., Headline) is a parent of content placeholder 340 (i.e., Picture), content placeholder 330 (i.e., Story 1), content placeholder 331 (i.e., Story 1 Cont'd), and content placeholder 350 (i.e., Caption 1). Content placeholder 350 (i.e., Caption 1) is illustrated as having a child relationship to content placeholder 340 (i.e., Picture 1). As mentioned above, the content placeholder 320 (i.e., Headline), content placeholders 330 (i.e., Story 1), 331 (i.e., Story 1 cont'd), 340 (i.e., Picture 1), and 350 (i.e., Caption 1) are grouped together to form a content block due to their relationship with each other. Similarly, the source document includes other content blocks such as the relationship between content placeholder 336 (i.e., Story 4), content placeholder 342 (i.e., Picture 2), and content placeholder 352 (i.e., Caption 2), and the relationship between content placeholder 338 (i.e., Story 5), content placeholder 344 (i.e., Picture 3), and content placeholder 354 (i.e., Caption 3). The remaining content placeholders represent individual content pieces that do not relate to other content placeholders. For example, content placeholder 332 (i.e., Story 2) and content placeholder 333 (i.e., Story 2 cont'd) represent one individual content piece. Likewise, content placeholder 334 (i.e., Story 3) and content placeholder 335 (i.e., Story 3 cont'd) represent another individual content piece. Content placeholder 360 (i.e., Address) represents another individual content piece (e.g., content piece 382 shown in FIG. 3).

Figure 5:
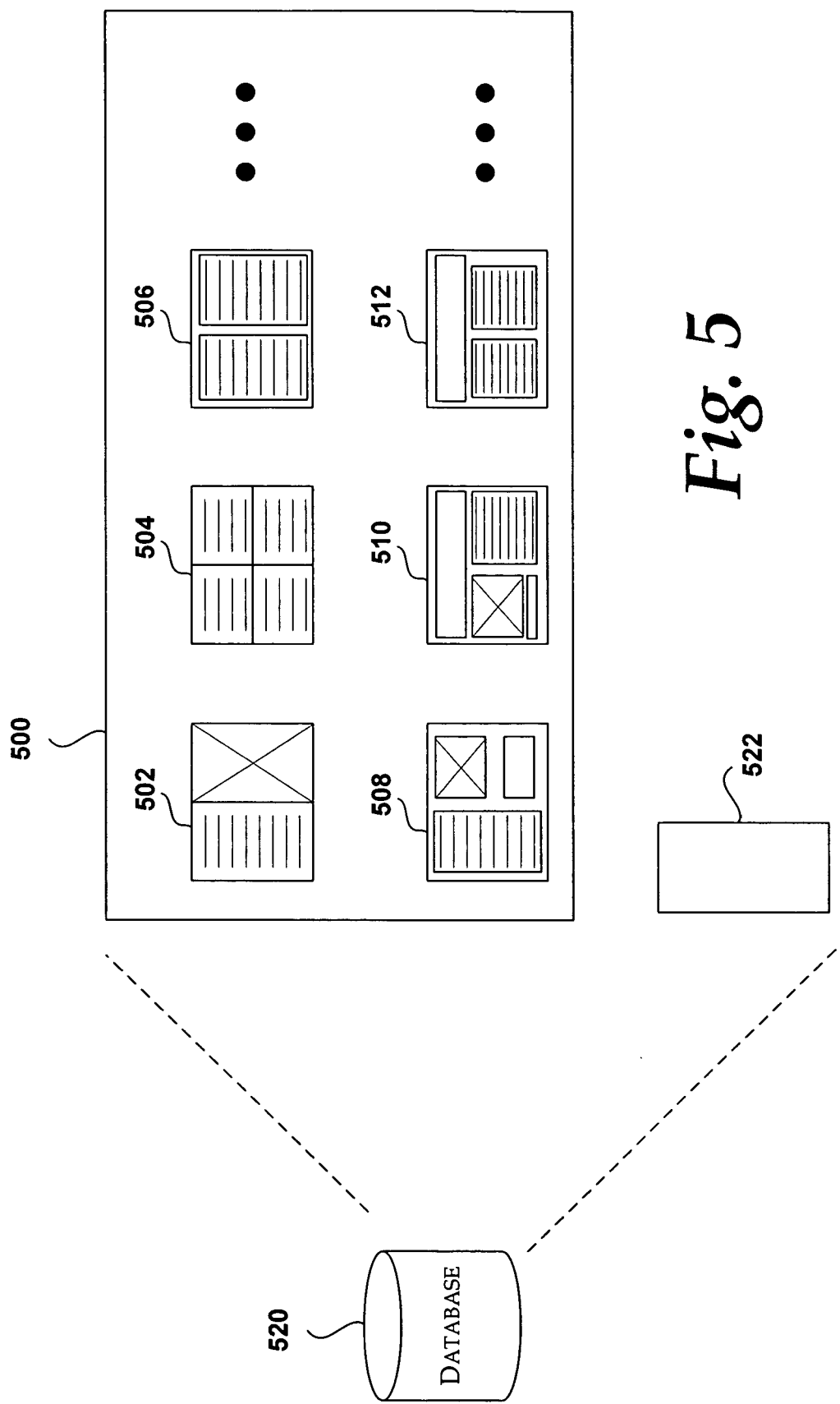
FIG. 5 is a block diagram illustrating a means for selecting one or more module templates for creating a destination template.

FIG. 5 is a block diagram illustrating a means for dynamically selecting one or more module templates for creating a destination template. The term template is used herein to indicate a computer-generated document into which content (text, images, data, etc.) is inserted into content placeholders of the template. Content placeholders refer to portions of the template/document pre-defined and/or pre-formatted for receiving content (e.g., text boxes). Content placeholders may have applied properties such as text fonts, text/image size limitations, and the like. As mentioned above, content placeholders may be associated with one type of content or multiple types of content. For instance, a multi-purpose placeholder may receive a picture or a picture grouped with a text caption. In addition, the multi-purpose placeholder may receive similar items, such as a diagram. The set of module templates 500 may be created by a user, or downloaded by a user from a template library provided by the user's application. Each of the module templates has specific properties. For example, some of the module templates may be specifically designed to render appropriately for different medium (e.g., email, website). For example, certain module templates may be designed to render in an email client using HTML. The present dynamic template creation process factors the medium into account when selecting the module templates. In addition, the dynamic selection process may omit certain content blocks or content pieces if the content block or content piece is not appropriate for the medium. For example, a street address that is listed on a newsletter for a recipient's address or a table of contents in a newsletter may be omitted or changed to hyperlinks if the medium is email. The inappropriate content may be identified within a predetermined list for each type of medium.

FIG. 5 identifies six exemplary module templates 502-512. Those skilled in the art will appreciate that other module templates may be added that provide additional layouts. The exemplary module templates are now described. Module template 502 represents a text place holder on the left hand column with a picture in the right hand column. Module template 504 represents four text placeholders, two in each vertical column. Module template 506 represents two text placeholders, one in each of two vertical columns. Module template 508 represents two columns with a text placeholder in the left column and an image placeholder and caption placeholder in the right column. Module template 510 represents a headline template with two columns, the left column having an image placeholder and caption placeholder and the right column having a text placeholder. Module template 512 represents a headline template with two columns each having a text placeholder.

The dynamic selection means may include a mapping means 522 that associates key properties of each module template with an associated module template. This mapping may be one to one or multiple to one. The mapping means may be in the form of a relationship database, lookup tables, and the like. For example, the mapping mechanism may identify a key property to designate whether the module template is email appropriate, then each module template that is email appropriate is listed under this key. Module templates that are email appropriate may have specific characteristics, such as being designed to accommodate stretching, being designed with limited number of images, being designed to be visually appealing using different sizes, and the like. Other key properties for the mapping means may include textual content, the number of textual content placeholders available, image content, headline, and the like. Thus, using the key properties, the mapping mechanism searches through the module templates for each content block and content piece identified for the source document. For example, the mapping mechanism searches through module templates 502-512 to identify the template that best matches the content block 380 illustrated in FIG. 3.

Continuing with the above example using source document 300 in FIG. 3, module template 510 that includes a headline placeholder, an image placeholder, a caption placeholder, and a story placeholder may be identified as a match for content block 380. It is important to note that one module template may be matched with several different content blocks. In addition, multiple content pieces may be grouped and matched with one of the module templates. Once a module template is identified for each content block and for each content piece, the destination template is created.

Figure 6:
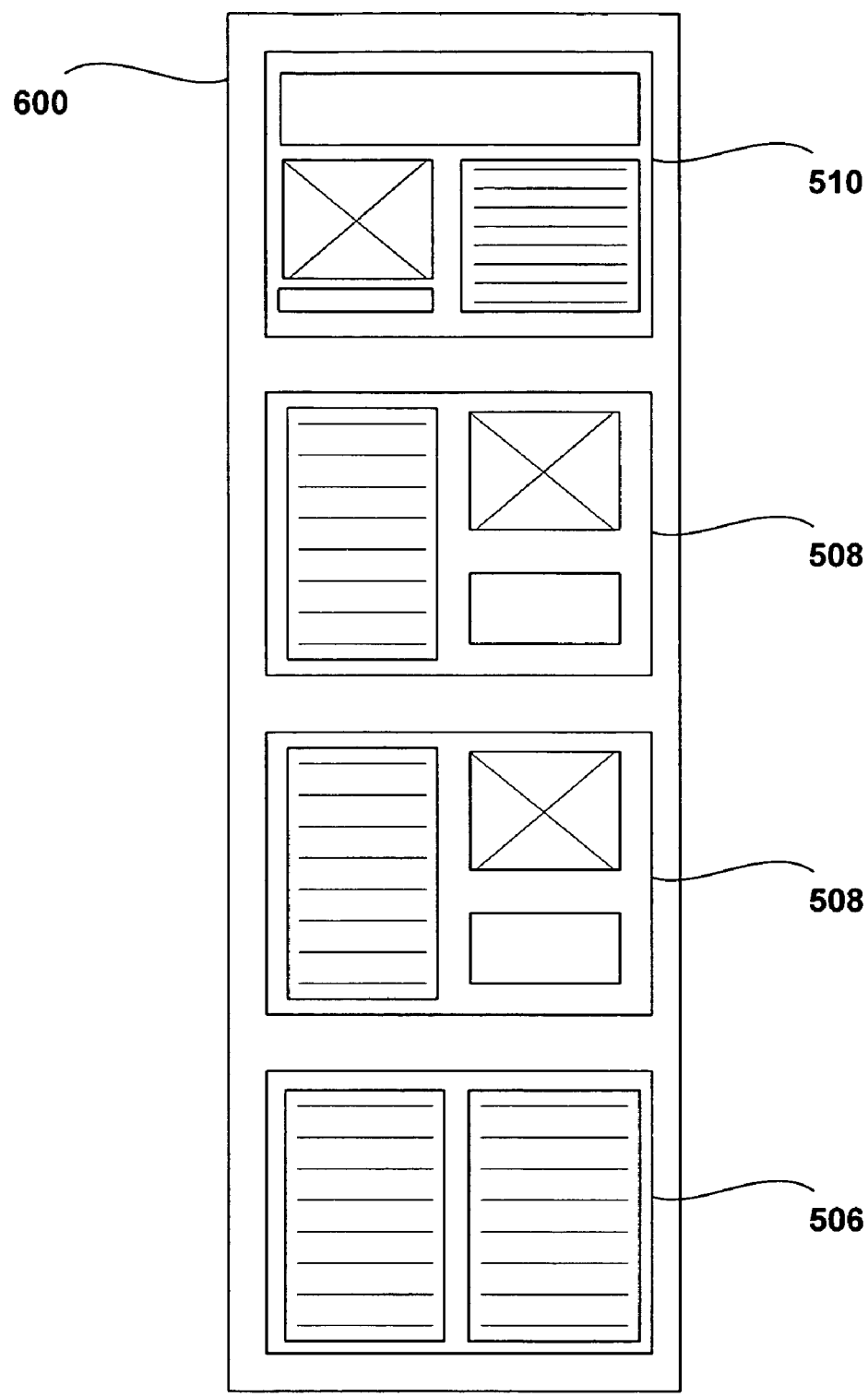
FIG. 6 is a block diagram illustrating the creation of the destination template based on the selected module templates.

FIG. 6 is a block diagram illustrating the creation of the destination template 600 based on the selected module templates. Continuing with the example module templates above, module templates 510, 508, and 506 were dynamically selected to best match the layout for the content blocks and content pieces identified within the source document shown in FIG. 3. Module template 510 was selected to match content block 380 that includes placeholders 320, 330, 331, 340, and 350. Module template 508 was selected to match the content block that includes placeholders 332, 333, 342, and 352. Module template 508 was also selected to match the content block that includes placeholders 334, 335, 344, and 354. Module template 506 was selected for individual content pieces that include placeholders 336 and 338. The individual content piece identified as placeholder 360 was omitted by the dynamic template creation process because the medium for which placeholder 360 was not appropriate for the destination medium. The mapping mechanism may include one or more keys that specify object types that are not appropriate for certain mediums. These keys are then applied to determine which content pieces are omitted from the destination template.

The mapping of the content from the source document to the destination template proceeds. It is important to note that the module templates do not necessarily have a fixed size, rather in the object property, a range may be specified. Therefore, a text box placeholder may specify that it can handle a range of 1-500 characters. This adds flexibility so that the dynamic template creation mechanism can match content blocks with module templates and know that the module templates will be able to accommodate the content block. In addition, additional flexibility is provided by using multi-purpose content placeholders that can receive different content types. For example, module template 508 that includes a text box on the left side may accommodate a range of characters from 200-1000 and adjust the text accordingly within the placeholder. The process of mapping the content to the destination template utilizes the application programming interfaces (APIs) for the specific application program. The application program determines the format for its internal representation. Typically, the format for the destination template may be a matter of convenience for the specific application. The application program then determines when to format the destination template for the desired medium.

During the mapping, the content objects, such as user-inserted text, images, and the like from the source document are populated into the destination template. A user interface may be provided to the user to alert the user as to any content objects that have not been mapped to the destination template and to allow the user to manually edit the destination template to insert one or more of those content objects into the destination template.

Thus, after the destination template is populated with the content, a user may publish the destination document in the desired medium. While the above described embodiment focuses on converting a newsletter to the body of an email, those skilled in the art will appreciate that the present dynamic template creation mechanism also operates to convert various document types into other document types for a variety of medium. For example, the dynamic template creation mechanism may have created a destination template for a website instead of email. For that embodiment, each page of the website may have been associated with one content block in the source document. In both cases, the final content is converted into HTML before publishing. Conversely, the present mechanism may create a destination template for a newsletter based on the body of an email. The body of the email may be broken into its content blocks and then the relevant module templates may have been selected to create a newsletter. This and other variations for the present dynamic template creation mechanism are envisioned. For each embodiment, the destination template is not a fixed template, but rather is dynamically generated based on the content with the source document.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the present dynamic template creation technique.

While example embodiments and applications have been illustrated and described, it is to be understood that the present garbage collection technique is not limited to the precise configuration and resources described above. Various modifications, changes, and variations apparent to those skilled in the art may be made in the arrangement, operation, and details of technique disclosed herein without departing from the scope of the claimed invention. Thus, as described, the present dynamic template creation technique allows users to create content once and publish it in various ways and in various mediums.

What is claimed is:

1. A computer-implemented method comprising:
   selecting a medium for publishing a destination template;
   determining a plurality of content objects within a source document, each content object holding information;
   grouping a portion of the content objects into a plurality of content blocks based on a prepared content schematic, wherein the content schematic comprises:
      a list of object properties for each content object;
      a proximity graph that represents physical relationships between the content objects within the source document;
      a relationship tree that represents functional relationships between content objects in the source document; and
      a priority list that lists the content objects based on pre-determined priority indicators;
   identifying at least one key property for each of one or more module templates, the at least one key property of each module template indicating the suitability of the module template for a content block;
   dynamically selecting a module template for each content block, the dynamic selection based on the selected medium and the at least one identified key property of each module template,
   wherein the selected module template includes one or more pre-formatted content placeholders configured to accommodate the information associated with each content object in the content block; and
   arranging the selected module templates into the destination template.

2. The computer-implemented method of claim 1, wherein the portion of the content objects is grouped based on a physical relationship between the content objects.

3. The computer-implemented method of claim 1, wherein the portion of the content objects is grouped based on a functional relationship between the content objects.

4. The computer-implemented method of claim 1, further comprising dynamically selecting other module templates to accommodate the information within the content objects that have not been grouped into one of the plurality of content blocks and arranging the other module templates with the selected module templates into the destination template.

5. The computer-implemented method of claim 1, further comprising mapping the information from the corresponding content objects into the destination template.

6. The computer-implemented method of claim 5, wherein selecting a medium includes selecting an email medium, further comprising creating an email document having the mapped information in the destination template.

7. The computer-implemented method of claim 1, wherein dynamically selecting the module template for each content block comprises looking-up properties associated with each module template in a database and correlating the look-up properties with the list of object properties identified within the content schematic.

8. The computer-implemented method of claim 1, wherein dynamically selecting a module template for each content block includes omitting one or more content blocks that are not suited for the selected medium.

9. The computer-implemented method of claim 1, wherein the module template includes a multi-purpose placeholder for receiving variable content types.

10. A computer-readable storage medium having computer-executable instructions for performing the method of claim 1.

11. A computer-readable storage medium having computer-executable instructions, the computer-executable instructions comprising:
a content analysis means for analyzing a plurality of content portions within a source document;
a group means for grouping one or more content blocks based on a relatedness of the plurality of content portions as indicated by a prepared content schematic, wherein the content schematic comprises:
a list of object properties for each content object;
a proximity graph that represents physical relationships between the content objects within the source document;
a relationship tree that represents functional relationships between content objects in the source document; and
a priority list that lists the content objects based on pre-determined priority indicators;
an identifier means for identifying at least one key property for each of the one or more module templates, the at least one key property of each module template indicating the suitability of the module template for a content block; and
a dynamic template creation means for dynamically creating a destination template based on content within the source document, a medium for publishing the destination template, and the at least one identified key property of each module template,
wherein dynamically creating the destination template comprises arranging a plurality of dynamically selected pre-formatted module templates, each selected module template corresponding to at least one of the one or more content blocks grouped within the source document.

12. The computer-readable storage medium of claim 11, wherein the medium comprises one out of a group comprising a body of an email, a website, and a print-friendly document.

13. The computer-readable storage medium of claim 11, wherein each content block represents a set of related content objects in the source document.

14. The computer-readable storage medium of claim 13, wherein the dynamic template creation means comprises a database that correlates properties of each module template with each identified content block.

15. The computer-readable storage medium of claim 13, wherein the module template is stretchable.

16. The computer-readable storage medium of claim 13, wherein at least one of the selected module templates includes a multi-purpose placeholder that receives one of a variety of content types.

17. A system configured to convert publishable content from a first medium to a second medium, the system comprising:
a processor; and
a memory into which a plurality of instructions are loaded, the plurality of instructions performing a method comprising:
accepting a source document in a first medium;
determining a plurality of content objects within the source document where each content object holds information;
grouping a portion of the content objects into a plurality of content blocks based on a prepared content schematic, wherein the content schematic comprises:
a list of object properties for each content object;
a proximity graph that represents physical relationships between the content objects within the source document;
a relationship tree that represents functional relationships between content objects in the source document; and
a priority list that lists the content objects based on pre-determined priority indicators;
identifying at least one key property for each of one or more module templates, the at least one key property of each module template indicating the suitability of the module template for a content block;
dynamically selecting a module template for each content block based on the information within each content block and the at least one identified key property of each module template; and
arranging the selected module templates into a destination template.

18. The system of claim 17, further comprising dynamically selecting the module template based on a second medium, wherein a destination document is published in the second medium and the destination document comprises the destination template and the mapped information from the corresponding content objects.

19. The system of claim 17, wherein each content block represents a set of related content objects in the source document.

20. The system of claim 17, further comprising mapping the information from the corresponding content objects into the destination template.

* * * * *